April 22, 1930. J. S. ROUX 1,755,363
MOP HANDLE
Filed July 2, 1929
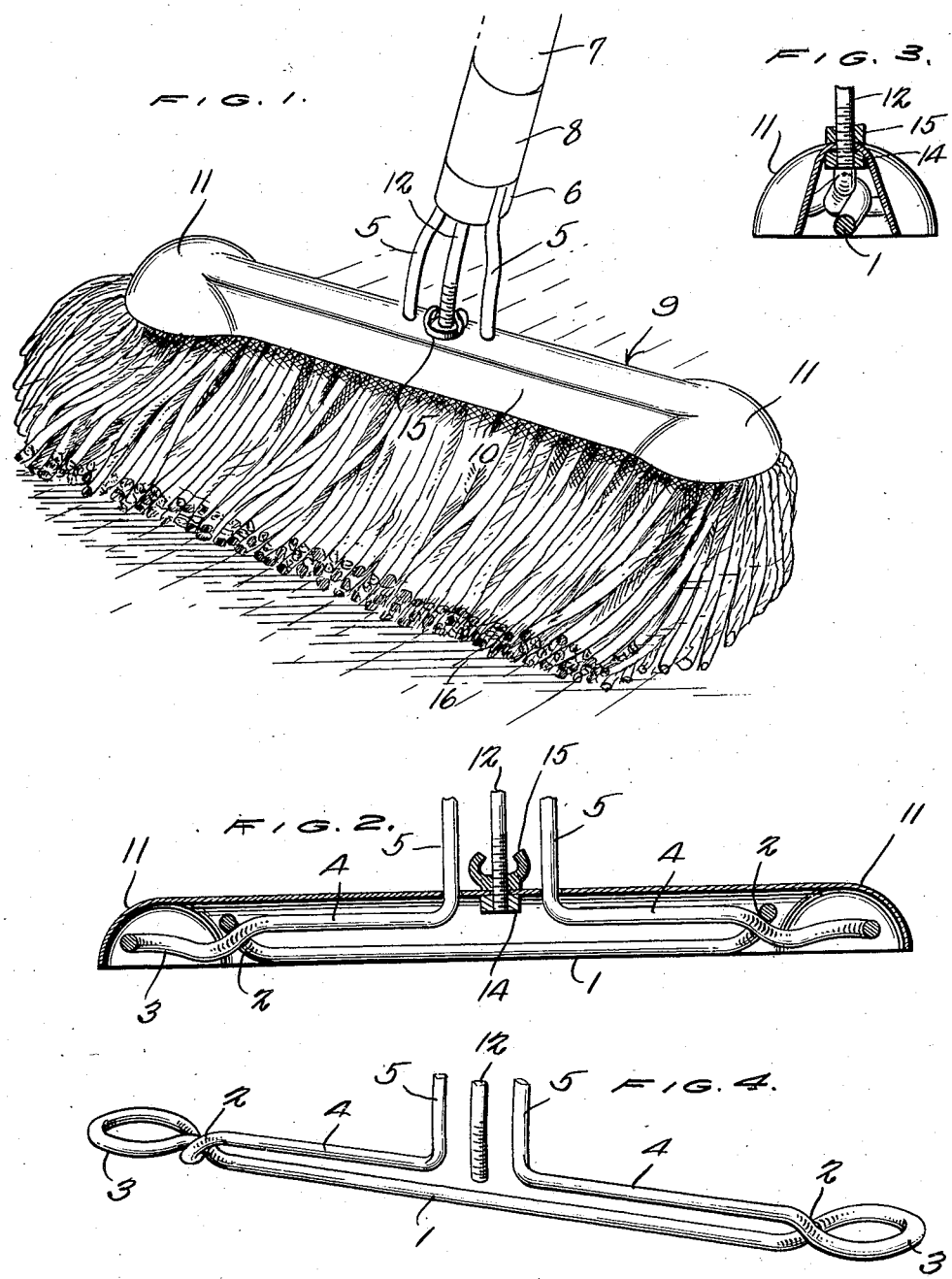
Joseph S. Roux, Inventor Patented Apr. 22, 1930

1,755,363

UNITED STATES PATENT OFFICE

JOSEPH S. ROUX, OF MANCHESTER, NEW HAMPSHIRE

MOP HANDLE

Application filed July 2, 1929. Serial No. 375,391.

This invention aims to provide a simple means whereby the head of a mop, brush, or the like, may be held on the handle of the article, the device being simple in construction, facile in operation, and capable of being manufactured at a small cost.

It is within the province of the invention to improve generally and to enhance the utility of devices of that type to which the present invention appertains.

With the above and other objects in view, which will appear as the description proceeds, the invention resides in the combination and arrangement of parts and in the details of construction hereinafter described and claimed, it being understood that changes may be made in the precise embodiment of the invention, within the scope of what is claimed, without departing from the spirit of the invention.

In the accompanying drawings:

Figure 1 shows in perspective, a device constructed in accordance with the invention;

Figure 2 is a longitudinal section;

Figure 3 is a transverse section;

Figure 4 is a perspective view, showing parts of the device which are made out of rod stock.

The device forming the subject matter of this application includes a transverse member 1, which, preferably, is in the form of a metal rod, the member 1 being crossed upon itself, as at 2, and being laterally extended, to form enlargements 3, in the form of eyes, the constituent material of the enlargements or eyes being prolonged to form arms 4 disposed approximately parallel to the transverse member 1. The arms 4 of the transverse member 1 are located in a common plane and that plane is at right angles to the plane in which the enlargements 3 are located. The arms 4 at their lower ends terminate in fingers 5 disposed at right angles to the arms. The fingers 5 are received in seats or grooves 6 formed in a grip 7, the fingers being held in the seats by a metal band 8 that surrounds the grip.

The numeral 9 designates, generally, a hollow jaw, which may be made of sheet metal. The jaw 9 comprises a trough-shaped intermediate portion 10 provided at its ends with enlarged cup-shaped heads 11. A threaded stem 12 is mounted at one end in the grip 7 and extends through the intermediate portion 10 of the jaw 9, as do the fingers 5. The jaw 9, thus, is mounted to slide on the stem 12 and on the fingers 5, toward and away from the grip 7 and toward and away from the transverse member 1 and the arms 4. The transverse member 1 and the arms 4 are received in the intermediate portion 10 of the jaw 9 and the cup-shaped heads 11 are for the reception of the enlargements or eyes 3. On the inner end of the stem 12, there is a stop 14, which may be a nut, and a clamp, in the form of a wing nut 15, is threaded on the stem 12.

The flexible head 16 of the mop is engaged over the arms 4, and by advancing the nut 15, the head 16 may be bound upon the arms 4, the transverse member 1, and the enlargements 3, by the jaw 9.

The device is simple in construction, but it will be found thoroughly effective for the ends in view. It forms a means whereby, through the instrumentality of simple materials, a swab head, a mop head, or the like, may be mounted on a handle. The grip 7, the fingers 5, and the stem 12 may be alluded to as a handle.

Having thus described the invention, what is claimed is:

1. In a device of the class described, a handle, a transverse member on the handle provided at its ends with enlargements which are widened in planes transverse to the axis of the handle, a hollow trough-shaped jaw in which the transverse member is received, the jaw being provided at its ends with enlarged cup-shaped elements receiving the enlargements of the transverse member, a head engaged between the transverse members and the jaw, the head being spread at its ends by the enlargements, and being held spread at its ends by the cup-shaped elements, and means for producing relative movement between the jaw and the transverse member, to effect a compression of the head.

2. In a device of the class described, a transverse member crossed upon itself near to its ends and spread to form enlarged, loopshaped eyes, the constituent material of the eyes being prolonged inwardly with respect to the eyes, in approximate parallelism to the transverse member to define arms, the arms terminating in fingers arranged approximately at right angles to the arms and to the planes in which the eyes are located, a handle on which the fingers are mounted, a hollow trough-shaped jaw slidable on the fingers and enclosing the transverse member and the arms, the jaw being provided at its ends with enlarged cup-shaped elements receiving the eyes, and a head engaged between the transverse member and the jaw, the head being spread at its ends by the eyes and being held spread at its ends by the cup-shaped elements, and means for producing relative movement between the jaw and the transverse member to effect a compression of the head.

In testimony that I claim the foregoing as my own, I have hereto affixed by signature.

JOSEPH S. ROUX.